United States Patent
Takayasu et al.

(10) Patent No.: US 8,820,464 B2
(45) Date of Patent: *Sep. 2, 2014

(54) COIL SPRING HOLDER FOR A SEAT LOAD SENSOR TO COMPENSATE FOR DIMENSIONAL ERRORS IN THE MANUFACTURING PROCESS

(75) Inventors: Wataru Takayasu, Reynoldsburg, OH (US); Shinya Ishima, Shioya-gun (JP); Shigeru Endo, Shioya-gun (JP); Kenji Sato, Sakura (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/985,932

(22) Filed: Jan. 6, 2011

(65) Prior Publication Data

US 2011/0094803 A1    Apr. 28, 2011

Related U.S. Application Data

(63) Continuation of application No. 11/992,418, filed as application No. PCT/JP2006/319479 on Sep. 29, 2006, now Pat. No. 8,051,941.

(30) Foreign Application Priority Data

Sep. 30, 2005    (JP) ................................. 2005-286881

(51) Int. Cl.
| | |
|---|---|
| *B60R 21/015* | (2006.01) |
| *G01G 19/52* | (2006.01) |
| *G01G 19/12* | (2006.01) |
| *B60N 2/44* | (2006.01) |
| *G01G 19/414* | (2006.01) |
| *B60N 2/06* | (2006.01) |
| *B60N 2/42* | (2006.01) |
| *B60N 2/00* | (2006.01) |
| *G01G 19/08* | (2006.01) |

(52) U.S. Cl.
CPC .............. *B60N 2/44* (2013.01); *G01G 19/4142* (2013.01); *B60N 2/06* (2013.01); *Y10S 177/09* (2013.01); *Y10S 411/946* (2013.01); *B60N 2/4263* (2013.01); *B60R 2021/01516* (2013.01); *B60R 21/015* (2013.01); *B60N 2/002* (2013.01); *G01G 19/08* (2013.01)
USPC ........ 180/273; 177/136; 177/DIG. 9; 280/735; 411/946

(58) Field of Classification Search
USPC ..................... 177/136, 144, DIG. 9; 180/273; 280/735; 296/68.1; 297/217.2
See application file for complete search history.

(56) References Cited

U.S. PATENT DOCUMENTS

| | | |
|---|---|---|
| 1,679,620 A | 8/1928 | Moore |
| 4,178,037 A | 12/1979 | Pickles |

(Continued)

FOREIGN PATENT DOCUMENTS

| | | |
|---|---|---|
| DE | 103 15 400 A1 | 10/2004 |
| GB | 2 415 787 A | 1/2006 |

(Continued)

OTHER PUBLICATIONS

Office Action for U.S. Appl. No. 12/588,922, mailed Mar. 8, 2011.

(Continued)

*Primary Examiner* — Randy W Gibson
(74) *Attorney, Agent, or Firm* — Oliff PLC

(57) ABSTRACT

An upper rail is movable in a rear and front direction with respect to a lower rail fixed to a vehicle floor. A load sensor is fixed to an upper surface of the upper rail, and a rectangular frame is attached onto the load sensor. A rod of the load sensor penetrates a web of the rectangular frame, a washer and a spring holder, and a coil spring is wound around the rod. A bush is fitted to an edge of a hole of the washer, and a step is formed between an upper surface of the washer and the bush. A nut is screwed to the rod and tightens a bottom of a cup portion of the spring holder. The coil spring is sandwiched between the spring holder and the web and is compressed, and an end portion of the coil spring engages with the step.

45 Claims, 7 Drawing Sheets

(56) References Cited

U.S. PATENT DOCUMENTS

| | | |
|---|---|---|
| 4,182,255 A | 1/1980 | Reid |
| 4,209,198 A | 6/1980 | Apple, Sr. |
| 4,281,443 A | 8/1981 | Threlfall |
| 4,353,565 A | 10/1982 | Smith et al. |
| 4,597,552 A | 7/1986 | Nishino |
| 5,110,177 A | 5/1992 | Akio |
| 5,286,076 A | 2/1994 | DeVoss et al. |
| 5,308,148 A | 5/1994 | Peterson et al. |
| 5,421,124 A | 6/1995 | Zuccaro |
| 5,478,975 A | 12/1995 | Ford |
| 5,492,388 A | 2/1996 | Kawasaki |
| 5,600,104 A | 2/1997 | McCauley et al. |
| 5,714,695 A | 2/1998 | Bruns |
| 5,921,624 A | 7/1999 | Wu |
| 5,942,695 A | 8/1999 | Verma et al. |
| 5,991,676 A | 11/1999 | Podoloff et al. |
| 6,039,344 A | 3/2000 | Mehney et al. |
| 6,050,635 A | 4/2000 | Pajon et al. |
| 6,089,478 A | 7/2000 | Truan et al. |
| 6,145,909 A | 11/2000 | Staley et al. |
| 6,150,619 A | 11/2000 | Borngasser |
| 6,176,543 B1 | 1/2001 | Nawata et al. |
| 6,231,076 B1 | 5/2001 | Blakesley et al. |
| 6,242,701 B1 | 6/2001 | Breed et al. |
| 6,356,200 B1 | 3/2002 | Hamada et al. |
| 6,367,859 B1 | 4/2002 | Flory et al. |
| 6,405,987 B1 | 6/2002 | Andrigo et al. |
| 6,499,360 B1 | 12/2002 | Bruns |
| 6,520,023 B2 | 2/2003 | Kimura |
| 6,555,765 B2 | 4/2003 | Paine |
| 6,559,392 B1 | 5/2003 | Haynes et al. |
| 6,616,239 B2 | 9/2003 | Guillot |
| 6,637,824 B1 | 10/2003 | Yokota |
| 6,644,903 B1 | 11/2003 | Arand |
| 6,661,341 B2 | 12/2003 | Masuda et al. |
| 6,677,539 B2 | 1/2004 | Miura et al. |
| 6,682,146 B2 | 1/2004 | Minai |
| 6,684,718 B2 | 2/2004 | Muraishi |
| 6,695,379 B1 | 2/2004 | Ishida |
| 6,702,376 B1 | 3/2004 | Shen |
| 6,772,985 B2 | 8/2004 | Lee |
| 6,773,069 B1 | 8/2004 | Kaneko et al. |
| 6,774,625 B2 | 8/2004 | Suzuki et al. |
| 6,786,691 B2 | 9/2004 | Alden |
| 6,810,984 B2 | 11/2004 | Sakai et al. |
| 6,814,370 B2 | 11/2004 | Yasui |
| 6,849,808 B2 | 2/2005 | Enomoto et al. |
| 6,916,997 B2 | 7/2005 | Thakur et al. |
| 6,929,324 B2 | 8/2005 | Enomoto et al. |
| 6,969,809 B2 | 11/2005 | Rainey |
| 6,981,717 B2 | 1/2006 | Sakamoto et al. |
| 6,994,397 B2 | 2/2006 | Young et al. |
| 7,036,864 B2 | 5/2006 | Rehfuss et al. |
| 7,038,146 B2 | 5/2006 | Saito et al. |
| 7,091,426 B2 | 8/2006 | Nagai et al. |
| 7,131,513 B2 | 11/2006 | Mutou et al. |
| 7,137,665 B2 | 11/2006 | Osawa et al. |
| 7,137,669 B2 | 11/2006 | Nagayama |
| 7,185,867 B2 | 3/2007 | Hill et al. |
| 7,189,931 B2 | 3/2007 | Hida et al. |
| 7,195,261 B2 | 3/2007 | Yoshida et al. |
| 7,210,358 B2 * | 5/2007 | Yamazaki ....................... 73/761 |
| 7,281,766 B2 | 10/2007 | Fujita et al. |
| 7,322,605 B2 | 1/2008 | Ventura et al. |
| 7,328,627 B2 | 2/2008 | Kawabata et al. |
| 7,373,846 B2 | 5/2008 | Furukawa et al. |
| 7,422,291 B2 | 9/2008 | Nagayama |
| 7,435,918 B2 | 10/2008 | Becker et al. |
| 7,438,350 B1 | 10/2008 | Peterson et al. |
| 7,455,343 B2 | 11/2008 | Endo et al. |
| 7,488,026 B1 | 2/2009 | Jovicevic |
| 7,510,161 B2 | 3/2009 | Fischer et al. |
| 7,520,175 B2 | 4/2009 | Matsukawa et al. |
| 7,604,213 B2 | 10/2009 | Choi et al. |
| 7,614,680 B2 | 11/2009 | Endo et al. |
| 7,729,122 B2 | 6/2010 | Wong |
| 7,730,794 B2 * | 6/2010 | Hwang et al. ............... 73/862.53 |
| 7,731,281 B2 | 6/2010 | Kurita et al. |
| 7,762,149 B2 * | 7/2010 | Hwang et al. ............ 73/862.391 |
| 7,762,150 B2 * | 7/2010 | Kawabata et al. ....... 73/862.474 |
| 7,793,557 B2 | 9/2010 | Endo et al. |
| 7,823,951 B2 | 11/2010 | Endo et al. |
| 7,836,997 B2 | 11/2010 | Takayasu et al. |
| 7,870,927 B2 | 1/2011 | Endo et al. |
| 7,878,570 B2 | 2/2011 | Endo et al. |
| 8,028,786 B2 | 10/2011 | Takayasu et al. |
| 8,051,941 B2 | 11/2011 | Takayasu et al. |
| 8,136,619 B2 | 3/2012 | Hwang et al. |
| 8,136,620 B2 | 3/2012 | Hwang et al. |
| RE43,989 E | 2/2013 | Furukawa et al. |
| 8,371,665 B2 | 2/2013 | Herrera et al. |
| 8,540,047 B2 | 9/2013 | Takayasu et al. |
| 8,548,687 B2 | 10/2013 | Jefferies et al. |
| 2003/0168895 A1 | 9/2003 | Sakai et al. |
| 2004/0032117 A1 | 2/2004 | Pinto et al. |
| 2004/0100388 A1 | 5/2004 | Yoshida et al. |
| 2004/0160113 A1 | 8/2004 | Rehfuss et al. |
| 2005/0061643 A1 | 3/2005 | Rainey |
| 2005/0099041 A1 | 5/2005 | Becker et al. |
| 2005/0109909 A1 | 5/2005 | Osawa et al. |
| 2005/0284668 A1 | 12/2005 | Hida et al. |
| 2005/0284669 A1 | 12/2005 | DiPaola et al. |
| 2006/0010984 A1 | 1/2006 | Yamazaki |
| 2006/0048582 A1 | 3/2006 | Furukawa et al. |
| 2007/0012487 A1 | 1/2007 | Becker et al. |
| 2007/0045986 A1 | 3/2007 | Lirot |
| 2007/0057527 A1 | 3/2007 | Endo et al. |
| 2008/0036251 A1 | 2/2008 | Endo et al. |
| 2008/0079296 A1 | 4/2008 | Endo et al. |
| 2008/0084086 A1 | 4/2008 | Endo et al. |
| 2009/0079239 A1 | 3/2009 | Endo et al. |
| 2009/0139774 A1 | 6/2009 | Takayasu et al. |
| 2009/0139775 A1 | 6/2009 | Takayasu et al. |
| 2009/0294185 A1 | 12/2009 | Bruzzone et al. |
| 2009/0301793 A1 | 12/2009 | Endo et al. |
| 2009/0301794 A1 | 12/2009 | Endo et al. |
| 2010/0282522 A1 | 11/2010 | Endo et al. |
| 2011/0000719 A1 | 1/2011 | Takayasu et al. |
| 2011/0006580 A1 | 1/2011 | Ishimoto et al. |
| 2011/0018301 A1 | 1/2011 | Endo et al. |
| 2011/0018302 A1 | 1/2011 | Endo et al. |
| 2011/0084525 A1 * | 4/2011 | Endo et al. .................. 297/217.2 |
| 2011/0202311 A1 * | 8/2011 | Cho et al. ...................... 702/173 |
| 2011/0303469 A1 * | 12/2011 | Saito et al. .................... 177/136 |

FOREIGN PATENT DOCUMENTS

| | | |
|---|---|---|
| JP | 63-026466 U | 2/1988 |
| JP | 05-043031 U | 6/1993 |
| JP | 8-164039 A | 6/1996 |
| JP | 9-207638 A | 8/1997 |
| JP | 10-297334 A | 11/1998 |
| JP | 11-108746 A | 4/1999 |
| JP | 11-304579 A | 11/1999 |
| JP | 2000-280813 A | 10/2000 |
| JP | 2001-030819 A | 2/2001 |
| JP | 2001-050329 A | 2/2001 |
| JP | 2001-158269 A | 6/2001 |
| JP | 2003-011709 A | 1/2003 |
| JP | 2003-166872 A | 6/2003 |
| JP | 2003-237535 A | 8/2003 |
| JP | 2003-287458 A | 10/2003 |
| JP | 2004-210167 A | 7/2004 |
| JP | A-2004-268620 | 9/2004 |
| JP | 2004-306849 A | 11/2004 |
| JP | 2008-296657 A | 12/2008 |

OTHER PUBLICATIONS

Notice of Allowance for U.S. Appl. No. 12/536,151, mailed Mar. 25, 2011.
Office Action for U.S. Appl. No. 12/961,758, mailed Mar. 28, 2011.
Office Action for U.S. Appl. No. 13/010,429, mailed May 2, 2011.
Office Action for U.S. Appl. No. 12/536,151, mailed Jan. 31, 2011.

(56) References Cited

OTHER PUBLICATIONS

U.S. Appl. No. 13/039,458, filed Mar. 3, 2011.
Office Action for U.S. Appl. No. 11/992,418, mailed Jan. 13, 2011.
Office Action for U.S. Appl. No. 12/875,594, mailed Jan. 20, 2011.
Notice of Allowance for U.S. Appl. No. 12/536,124, mailed Jan. 18, 2011.
U.S. Appl. No. 13/010,429, filed Jan. 20, 2011.
"Radius" from eFunda Design Standards website, Copyright 2010 by eFunda, Inc. (http://www.efunda.com/designstandards/plastic_design/radius.cfm).
"What is eFunda" from eFunda Design Standards website, Copyright 2010 by eFunda, Inc. (http://www.efunda.com/about/about.cfm).
English-language translation of Japanese Office Action in Application No. 2004-223456, mailed Aug. 3, 2010.
Office Action for U.S. Appl. No. 12/536,075, mailed Apr. 7, 2010.
Office Action for U.S. Appl. No. 12/536,075, mailed Oct. 15, 2010.
Office Action for U.S. Appl. No. 12/536,124, mailed Jul. 1, 2010.
Notice of Allowance for U.S. Appl. No. 12/536,075, mailed Nov. 8, 2010.
Office Action for U.S. Appl. No. 12/536,151, mailed Aug. 10, 2010.
Office Action for U.S. Appl. No. 11/992,418, mailed Jul. 2, 2009.
Notice of Allowance for U.S. Appl. No. 11/992,418, mailed Feb. 18, 2010.
Office Action for U.S. Appl. No. 11/992,418, mailed Jun. 3, 2010.
Office Action for U.S. Appl. No. 12/588,922, mailed Sep. 29, 2010.
European Search Report for European Application No. 10007613.2 dated Oct. 9, 2010.
Office Action issued on Jun. 6, 2011 in U.S. Appl. No. 13/039,458.
Office Action issued Jun. 7, 2011 in U.S. Appl. No. 11/992,418.
Notice of Allowance issued Jul. 29, 2011 in U.S. Appl. No. 11/992,418.
Notice of Allowance issued Jul. 13, 2011 in U.S. Appl. No. 12/875,594.
Dec. 15, 2011 Search Report issued in European Application No. 11181454.7.
Jan. 12, 2012 Office Action issued in European Application No. 10007613.2.
Jun. 13, 2013 Office Action issued in U.S. Appl. No. 13/175,565.
May 24, 2012 Second Office Action issued in Chinese Application No. 201010552150.5 with English-language translation.
Aug. 2, 2012 Office Action issued in U.S. Appl. No. 13/137,713.
Apr. 3, 2013 Office Action issued in U.S. Appl. No. 12/588,922.
Feb. 11, 2013 Office Action issued in U.S. Appl. No. 13/175,565.
Jan. 28, 2013 Final Office Action issued in U.S. Appl. No. 13/137,713.
Nov. 29, 2011 Notification of Refusal issued in Japanese Application No. 2007-537702 with English-language translation.
Nov. 30, 2011 First Office Action issued in Chinese Application No. 201010552150.5 with English-language translation.
Apr. 9, 2012 Office Action issued in U.S. Appl. No. 13/105,483.
Aug. 23, 2013 Office Action issued in U.S. Appl. No. 13/242,780.
Oct. 9, 2013 Office Action issued in U.S. Appl. No. 12/588,922.
Oct. 22, 2013 Office Action issued in U.S. Appl. No. 13/010,429.
Dec. 13, 2013 Office Action issued in U.S. Appl. No. 13/601,330.
Jan. 8, 2014 Office Action issued in U.S. Appl. No. 13/175,565.
May 14, 2014 Office Action issued in U.S. Appl. No. 13/010,429.

* cited by examiner

COIL SPRING HOLDER FOR A SEAT LOAD SENSOR TO COMPENSATE FOR DIMENSIONAL ERRORS IN THE MANUFACTURING PROCESS

This is a Continuation of application Ser. No. 11/992,418 filed Mar. 21, 2008, which is a National Stage of Application No. PCT/JP2006/319479 filed Sep. 29, 2006, which claims priority to Japanese Application No. 2005-286881 filed Sep. 30, 2005. The disclosures of the prior applications are hereby incorporated by reference herein in their entirety.

TECHNICAL FIELD

The present invention relates to a passenger's weight measurement device for a vehicle seat, which measures a weight of a passenger seated on the vehicle seat, and to an attachment structure for attaching a load sensor to the passenger's weight measurement device.

BACKGROUND ART

In recent years, in some cases, operations of various safety devices such as a seat belt and an air bag have been controlled in accordance with a weight of a passenger seated on a vehicle seat for the purpose of enhancing performance of the safety devices. In a conventional passenger's weight measurement device that measures the weight of the seated passenger, a load sensor is interposed between a vehicle floor and the vehicle seat (for example, refer to Patent Document 1 and Patent Document 2).
Patent Document 1: JP A H8-164039
Patent Document 2: JP A H9-207638

DISCLOSURE OF THE INVENTION

Problems to be Solved by the Invention

However, there is a dimension error or an assembling position error when the passenger's weight measurement device is assembled, when the vehicle seat is fixed to the passenger's weight measurement device or when the passenger's weight measurement device is fixed to the vehicle floor, or the like. Accordingly, it has been difficult to assemble the passenger's weight measurement device.

In this connection, it is an object of the present invention to provide a passenger's weight measurement device for a vehicle seat, which is more easily assembled.

Means for Solving the Problems

In order to solve the above-described problem, a passenger's weight measurement device for a vehicle seat according to the present invention comprises: an upper rail provided on a lower rail fixed to a vehicle floor so as to be movable in a rear and front direction; a load sensor fixed onto the upper rail; and a frame provided on the load sensor and below the vehicle seat, wherein a rod is extended from the load sensor, and the rod sequentially penetrates the frame, a plain washer and a spring holder, and is inserted into a coil spring, a bush is disposed along an edge of a hole of the plain washer, though which the rod is inserted, and a step difference is formed between an upper surface of the plain washer and the bush by protruding the bush from the upper surface, and a nut is screwed to the rod from above the spring holder, and the coil spring is sandwiched between the spring holder and the frame and is compressed and an end portion of the coil spring engages with the step difference by tightening the nut to the spring holder.

Effect of the Invention

In accordance with the present invention, the frame can be shifted in the vertical direction with respect to the load sensor. Accordingly, even if the lower rail, the upper rail, the frame and the like are distorted during the assembling or the like, an initial load generated by such distortions can be prevented from being applied to the load sensor.

Moreover, the coil spring is sandwiched between the frame and the spring holder in a state of being compressed by tightening the nut. Accordingly, the load sensor is fixed to the frame more stably and appropriately. Therefore, it becomes easier to assemble the passenger's weight measurement device.

Furthermore, the load is stably applied from the coil spring to the nut owing to elastic deformation of the coil spring, which is caused by tightening the nut.

Moreover, by tightening the nut, the end portion of the coil spring engages with the step difference formed between the upper surface of the washer and the bush. Accordingly, the coil spring is centered with respect to the washer without slipping on the upper surface of the washer.

BEST MODE FOR CARRYING OUT THE INVENTION

A best mode for carrying out the present invention will be described below by using the drawings. On embodiments to be described below, a variety of technically preferable limitations are imposed in order to carry out the present invention; however, the scope of the invention is not limited to the following embodiment and illustrated examples.

Figure 1:
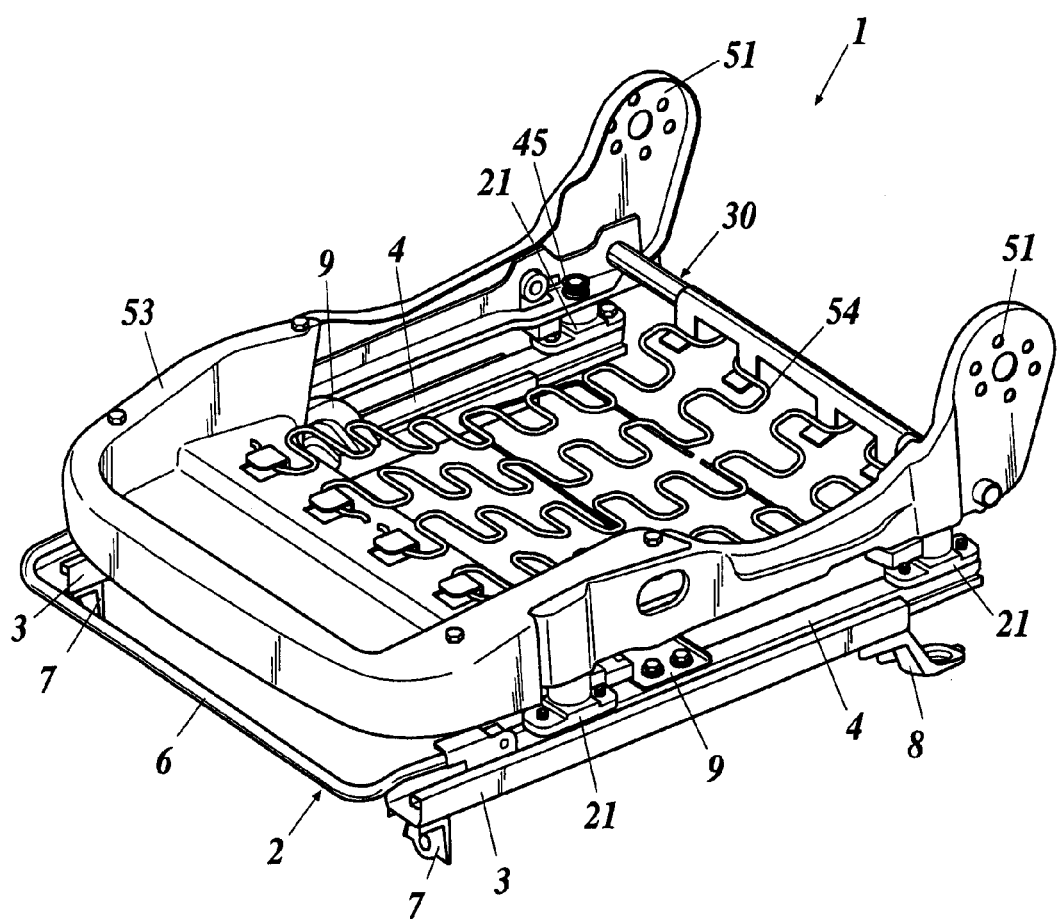
FIG. 1 This is a perspective diagram of a passenger's weight measurement device 1 for a vehicle seat.
Figure 2:
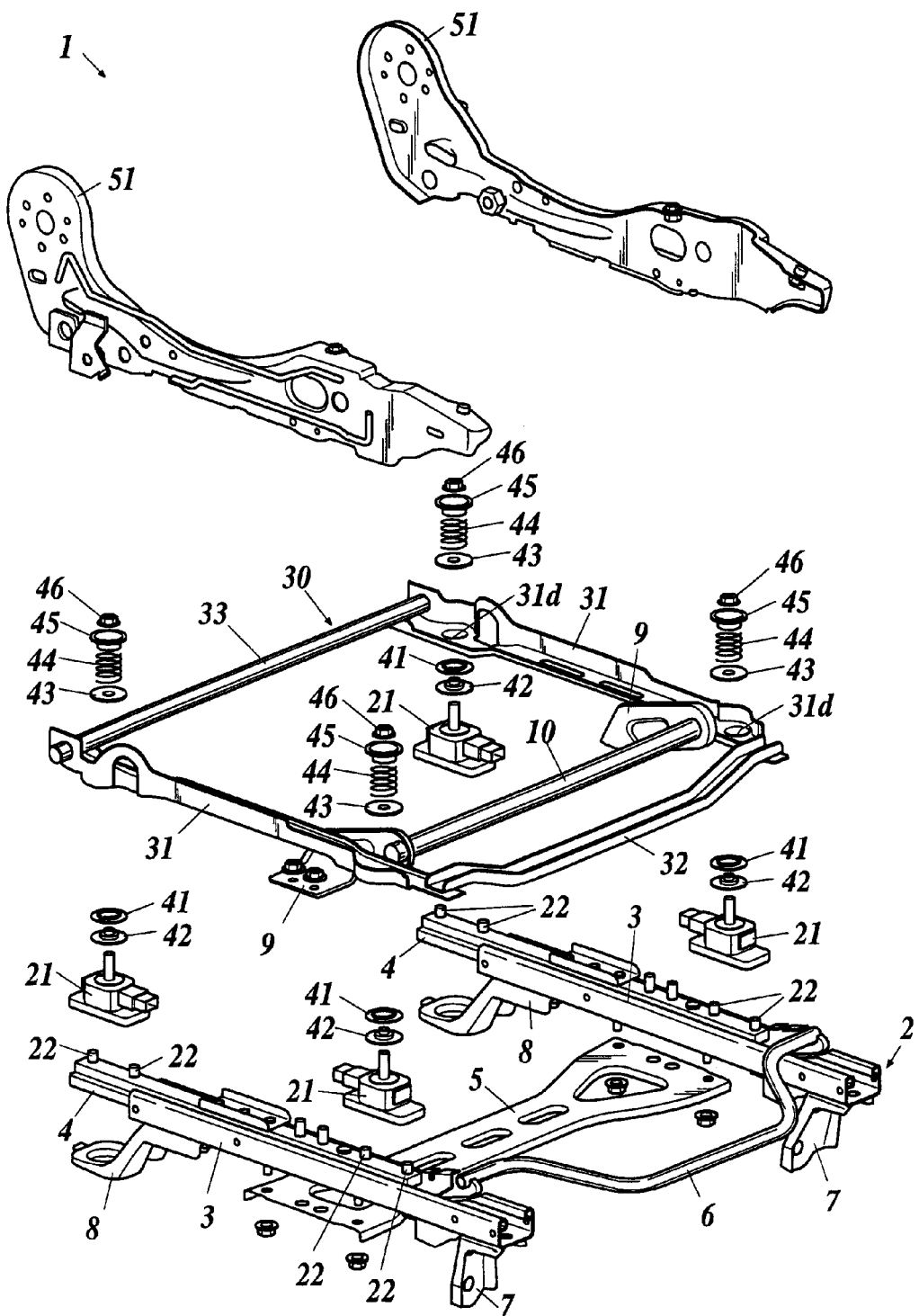
FIG. 2 This is an exploded perspective diagram of the passenger's weight measurement device 1.

FIG. 1 is a perspective diagram of a passenger's weight measurement device 1 for a vehicle seat, and FIG. 2 is an exploded perspective diagram of the passenger's weight measurement device 1.

As shown in FIG. 1 and FIG. 2, a slide adjuster 2 for adjusting a back-and-forth position of the vehicle seat is attached onto a floor of a passenger's room. The slide adjuster 2 includes a left and right pair of lower rails 3 provided in parallel to each other, a left and right pair of upper rails 4 engaged with the lower rails 3 so as to be capable of sliding on the respective lower rails 3 in a rear and front direction with respect to the lower rails 3, a lower bracket 5 fixed to lower surfaces of the lower rails 3 by bolt/nut coupling or rivet coupling and bridged between the left and right lower rails 3, a lock mechanism 6 for locking the upper rails 4 to the lower rails 3 and for releasing the locking, brackets 7 attached onto front end portions of the lower surfaces of the respective lower rails 3, and brackets 8 attached onto rear end portions of the lower surfaces of the respective lower rails 3. These brackets 7 and 8 are attached onto the vehicle floor, and the lower rails 3 are fixed to the vehicle floor.

Brackets 9 are fixed to middle positions of upper surfaces of the respective upper rails 4 in a rear and front direction by the bolt/nut coupling or the rivet coupling. The brackets 9 are provided in a state of being erected with respect to upper surfaces of the upper rails 4. A right end portion of a submarine pipe 10 is welded to the brackets 9, and the submarine pipe 10 is bridged between the two left and right brackets 9.

A load sensor 21 is mounted on a front end portion of the upper surface of the right upper rail 4, and another load sensor 21 is mounted on a rear end portion thereof. Also on the upper surface of the left upper rail 4, load sensors 21 are mounted on a front end portion and rear end portion thereof, respectively. When viewed from the above, these four load sensors 21 are arranged so as to be apexes of a square or a rectangle.

Figure 3:
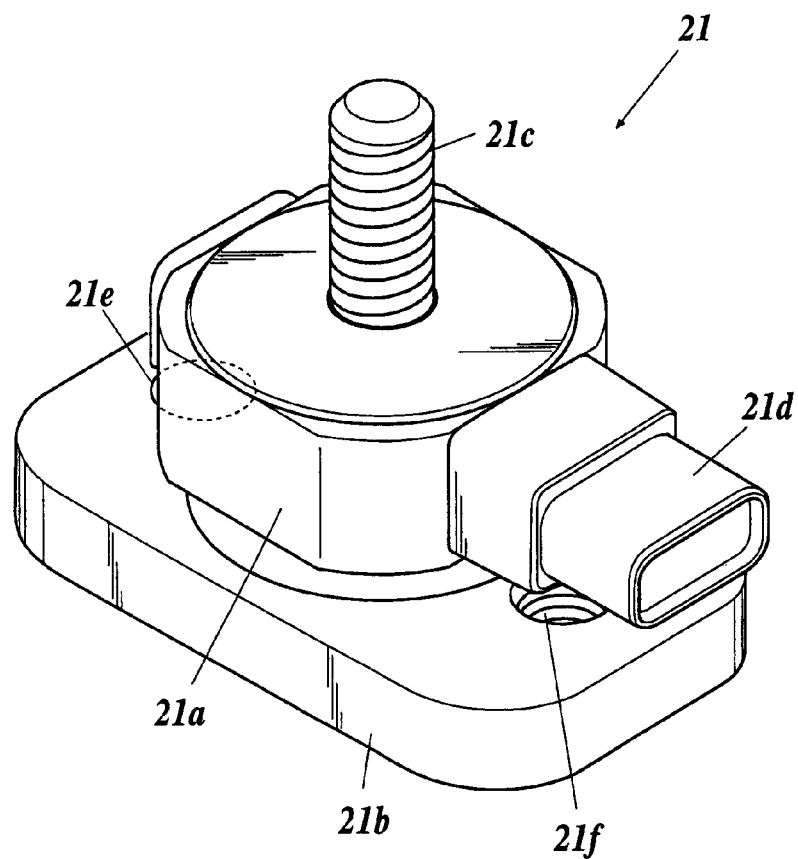
FIG. 3 This is a perspective diagram of a load sensor 21.

FIG. 3 is a perspective diagram of the load sensor 21. All of the load sensors 21 are provided in a similar way. As shown in FIG. 3, the load sensor 21 includes a columnar sensing portion 21*a* that senses a load, a plate-like flange portion 21*b* extending horizontally in a rear and front direction from a lower end of the sensing portion 21*a*, a rod 21*c* extending upward from an upper end of the sensing portion 21*a*, and a connector 21*d* extending from the sensing portion 21*a* so as to be parallel to the flange portion 21*b*. The rod 21*c* is formed into a male screw shape. Female screw-shaped circular holes 21*e* and 21*f* which penetrate the flange portion 21*b* in the vertical direction are formed in front and rear portions of the flange portion 21*b*, respectively. The sensing portion 21*a* incorporates a strain gauge therein, and the load is converted into an electric signal by the strain gauge.

As shown in FIG. 2, the load sensor 21 is fixed to the right upper rail 4. Specifically, a lower surface of the flange portion 21*b* abuts on the upper surface of the upper rail 4, and two bolts 22 inserted through the upper rail 4 upward from below are screwed to the circular holes 21*e* and 21*f*, respectively. Therefore, the load sensor 21 is fixed. Note that the load sensor 21 may be fixed to the upper rail 4 by fastening nuts to the bolts 22 on the flange portion 21*b* without forming any screw threads in the circular holes 21*e* and 21*f*.

Any load sensor 21 is fixed to the upper rails 4 as described above. However, with regard to the two load sensors 21 fixed to the rear portions thereof, the connectors 21*d* are directed forward, and with regard to the two load sensors 21 fixed to the front portions thereof, the connectors 21*d* are directed backward.

Figure 4:
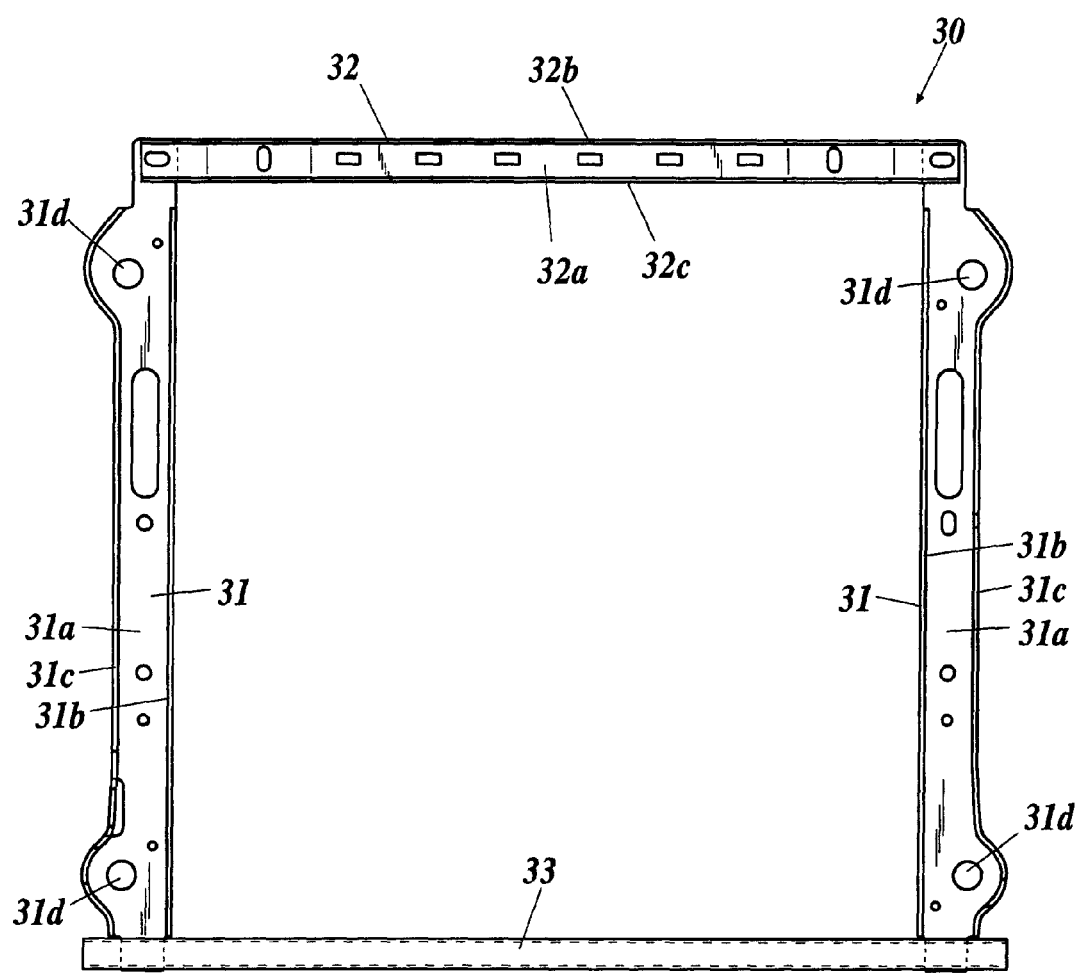
FIG. 4 This is a plan diagram of a rectangular frame 30.

As shown in FIG. 1 and FIG. 2, the frame 30 having a rectangular frame shape is mounted on these four load sensors 21. FIG. 4 is a top diagram of the rectangular frame 30. As shown in FIG. 4, the rectangular frame 30 is composed of a left and right pair of beams 31, a front beam 32, and a rear cross pipe 33.

Either of the beams 31 is a metal member having a U-shaped cross section, and has a web 31*a*, an inner flange 31*b*, and an outer flange 31*c*. Attachment holes 31*d* are formed in a front portion and a rear portion of the web 31*a*, respectively.

The front beam 32 is a metal member having a U-shaped cross section, and has a web 32*a*, a front flange 32*b*, and a rear flange 32*c*. The front beam 32 is bridged between front end portions of the left and right beams 31, and is welded to these beams 31.

The cross pipe 33 is bridged between rear end portions of the left and right beams 31, and is welded to these beams 31.

Figure 5:
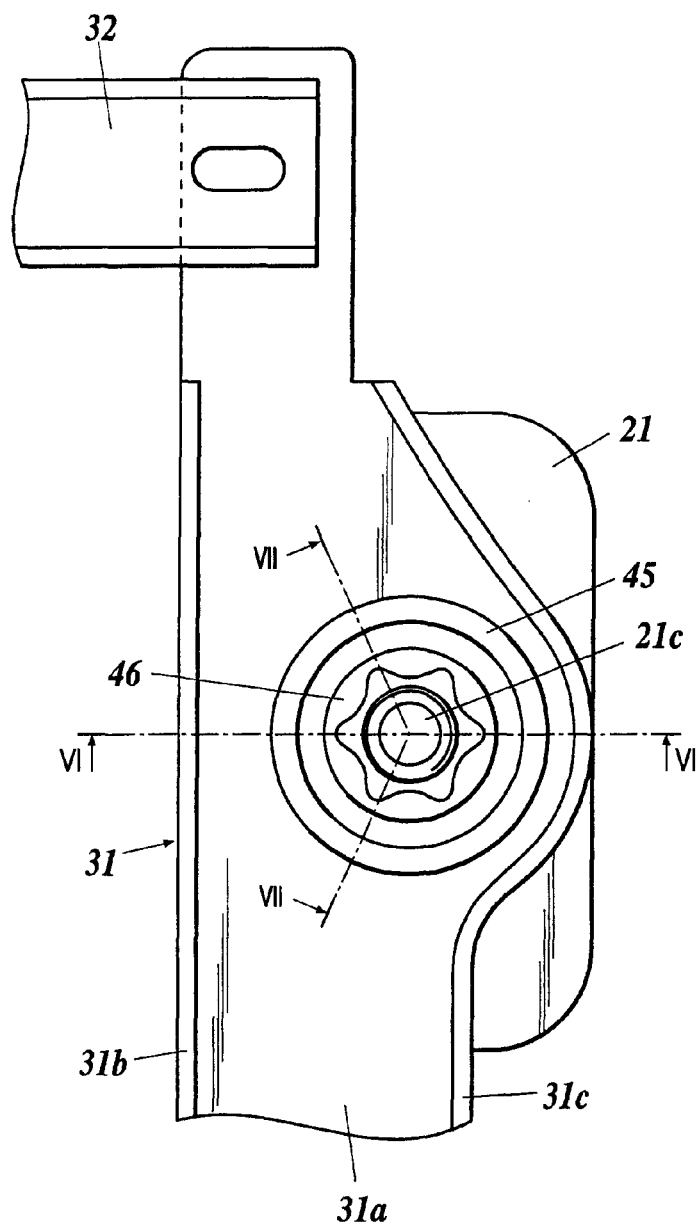
FIG. 5 This is a plan diagram of a right front portion of the rectangular frame 30.
Figure 6:
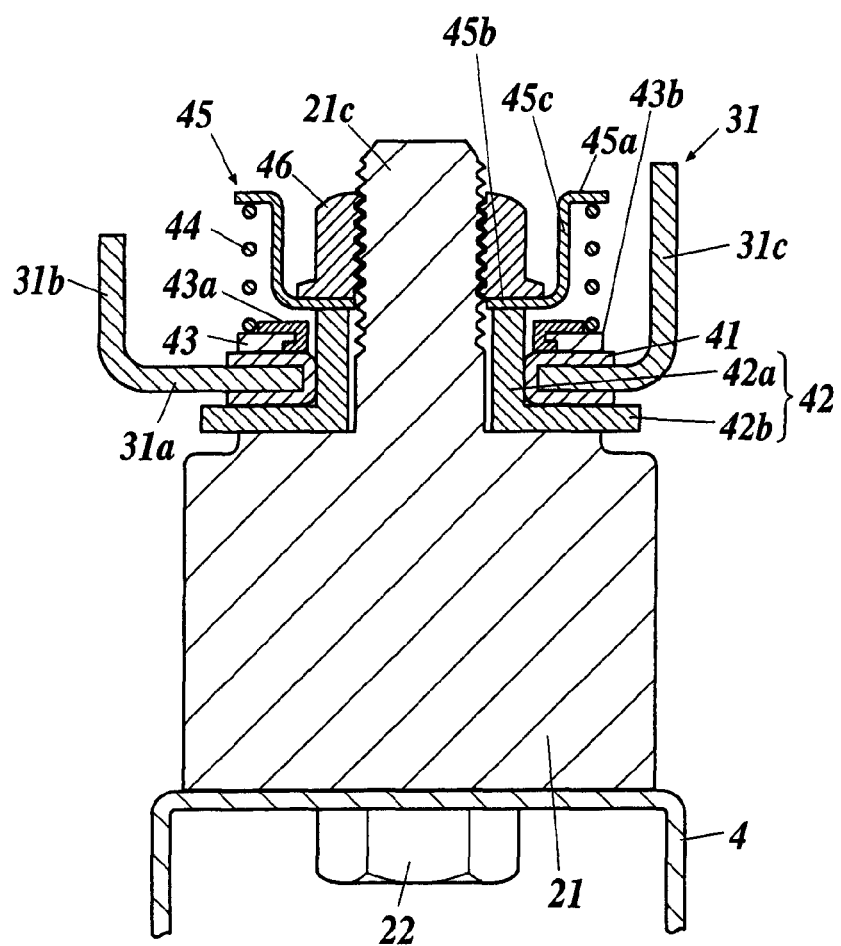
FIG. 6 This is a cross-sectional diagram showing a cross section along a line VI-VI of FIG. 5.
Figure 7:
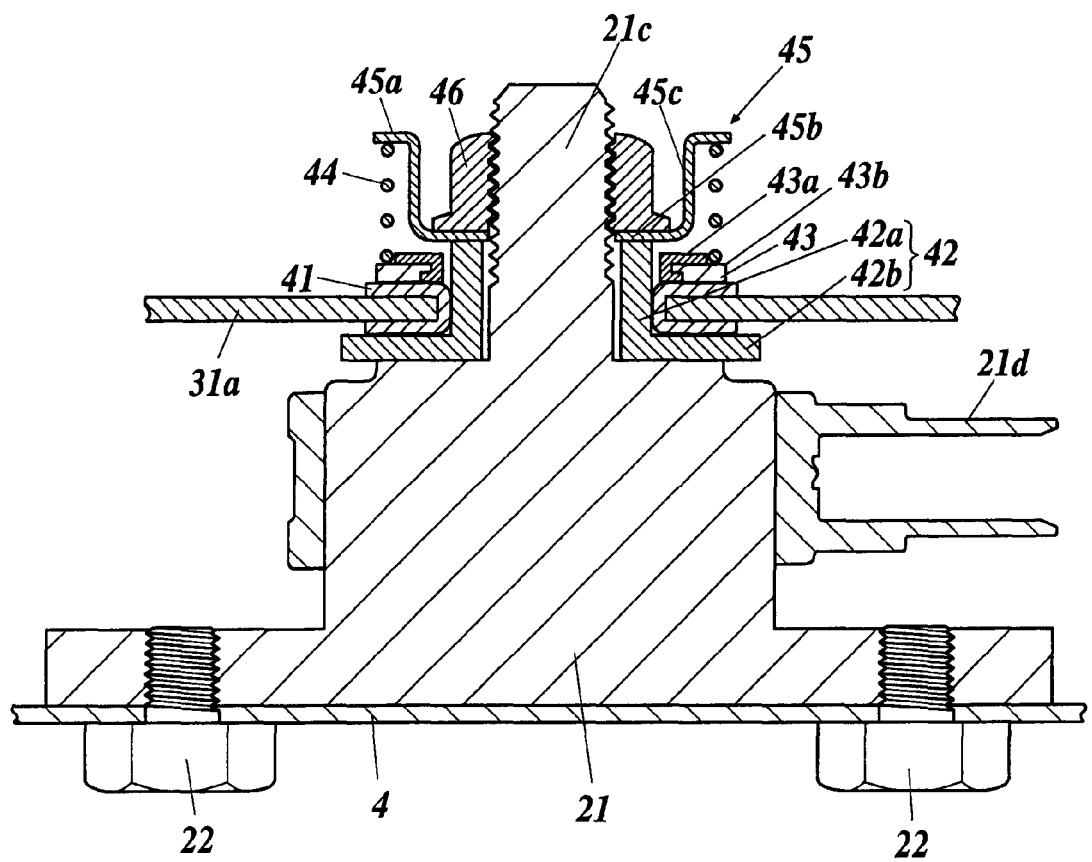
FIG. 7 This is a cross-sectional diagram showing a cross section along a line VII-VII of FIG. 5.

The rods 21*c* of the load sensors 21 are inserted into the respective attachment holes 21*d* upward from below, and nuts 46 are screwed to the rods 21*c*. Therefore, the load sensors 21 are attached onto a right front portion, a right rear portion, a left front portion and a left rear portion of the rectangular frame 30, respectively. Referring to FIG. 5 to FIG. 7, an attachment structure for attaching the right front load sensor 21 onto the right front portion of the rectangular frame 30 will be described. FIG. 5 is a plan diagram of the right front portion of the rectangular frame 30, FIG. 6 is a cross-sectional diagram showing a cross section along a line VI-VI, and FIG. 7 is a cross-sectional diagram showing a cross section along a line VII-VII. As shown in FIG. 5 to FIG. 7, an annular bush 41 is fitted to an edge of the right front attachment hole 31*d*, and grease is applied on the bush 41. The bush 41 is made of synthetic resin. Moreover, a stepped collar 42 composed of a cylindrical portion 42*a* and an annular plate-like flange portion 42*b* formed on one end surface of the cylindrical portion 42*a* is inserted through the attachment hole 31*d* in an inside of the bush 41. Here, the cylindrical portion 42*a* is inserted through the attachment hole 31*d* upward from below, and the flange portion 42*b* engages with a lower surface of the web 31*a* via the bush 41. Therefore, the stepped collar 42 is not pulled out upward. Moreover, the cylindrical portion 42*a* protrudes from an upper surface of the web 31*a*, and an upper end surface of the cylindrical portion 42*a* is located at a higher position than the upper surface of the web 31*a*. Here, the cylindrical portion 42*a* is fitted to the bush 41, and there is no gap between the cylindrical portion 42*a* and the bush 41.

The rod 21*c* of the load sensor 21 is inserted through the stepped collar 42 upward from below. An inner diameter of the stepped collar 42 is designed to be slightly larger than a diameter of the rod 21*c*, and by such designing, a dimension error and an attachment position error are solved.

The nut 46 is screwed to the rod 21*c*. A plain washer 43, a coil spring 44 and a spring holder 45 are interposed between the upper surface of the web 31*a* of the beam 31 and the nut 46. An annular bush 43*a* is disposed along an edge of a hole of the plain washer 43, and the edge of the hole of the plain washer 43 is sandwiched vertically by this bush. Therefore, the bush 43*a* is fitted to the edge of the hole of the plain washer 43. In such a way, the bush 43*a* and the plain washer 43 are integrated with each other. Moreover, the bush 43*a* protrudes from an upper surface of the plain washer 43. Therefore, a step difference 43*b* is formed on the upper surface of the plain washer 43 by the bush 43*a*. Moreover, a lower surface of the plain washer 43 and a lower surface of the bush 43*a* become flush with each other. Furthermore, the rod 21*c* is inserted through the coil spring 44, the coil spring 44 is set in a state of being mounted on the plain washer 43 on a circumference of the bush 43*a*, and an end portion of the coil spring 44 engages with the step difference 43*b* formed by the bush 43*a*. Therefore, the coil spring 44 is centered with respect to the plain washer 43. A portion of the coil spring 44, which is brought into contact with the plain washer 43, is formed to be flat. The bush 43*a* is made of synthetic resin, and a tapping sound is prevented by the bush 43*a*.

The spring holder 45 includes a cup portion 45*c* in which a through hole is formed in a bottom 45*b*, and an annular flange 45*a* formed on an outer circumferential surface in an opening of the cup portion 45*c*. Then, the rod 21*c* penetrates through the through hole of the bottom 45*b* of the cup portion 45*c*, the bottom 45*b* of the cup portion 45*c* is set in a state of being mounted on an end surface of the stepped collar 42, and the cup portion 45*c* is inserted into the coil spring 44. Moreover, the coil spring 44 and the plain washer 43 are set in a state of being sandwiched between the flange 45a of the spring holder 45 and the web 31a.

The nut 46 is screwed to the rod 21c in a state of being inserted into the cup portion 45c, and by tightening the nut 46, the bottom 45b of the cup portion 45c is sandwiched between the nut 46 and the upper end surface of the cylindrical portion 42a, and the coil spring 44 and the plain washer 43 are sandwiched between the flange 45a and the web 31a of the beam 31. Moreover, since the coil spring 44 is compressed by tightening the nut 46, the load is applied to the nut 46, and accordingly, the nut 46 is prevented from being loosened.

Like the right front load sensor 21, the left front, left rear and right rear load sensors 21 are attached onto the left front, left rear and right rear attachment holes 31d, respectively. In a state where the four load sensors 21 are attached onto the rectangular frame 30, the submarine pipe 10 is located behind the front beam 32.

As shown in FIG. 1 and FIG. 2, side frames 51 are welded to the outer flanges 31c of the left and right beams 31, respectively. These side frames 51 are parts of a bottom frame of the vehicle seat.

From above, front portions of the side frames 51 are covered with a pan frame 53, and the side frames 51 and the pan frame 53 are fixed to each other by the bolt/nut coupling or the rivet coupling. A seat spring 54 is bridged between the cross pipe 33 and the pan frame 53, a cushion is mounted on the pan frame 53 and the seat spring 54, and the cushion, the pan frame 53 and the side frames 51 are entirely covered with a cover.

A backrest frame is coupled to rear ends of the side frames 51, and is capable of rising and falling by a reclining mechanism. Note that the backrest frame and the cushion are not shown in order to make it easy to view the drawings.

In the passenger's weight measurement device 1 configured as described above, when a passenger is seated on a seat bottom, a weight of the passenger is applied to the four load sensors 21 through the rectangular frame 30, and is converted into electric signals by these load sensors 21.

Here, the load sensors 21 are attached between the upper rails 4 and the rectangular frame 30, and the load sensors 21 move in a rear and front direction integrally with the vehicle seat. Accordingly, a load inputted from the vehicle seat to the load sensors 21 can be always kept constant irrespective of position of the vehicle seat in a rear and front direction. Therefore, measuring accuracy of the passenger's weight can be enhanced.

Moreover, the spring holder 45 is mounted on the upper end surface of the stepped collar 42, and the coil spring 44 is sandwiched between the spring holder 45 and the web 31a by tightening the nut 46. Accordingly, the rectangular frame 30 can be shifted in the vertical direction with respect to the load sensors 21. Therefore, noise of the load generated by distortion of the slide adjuster 2 and the like becomes smaller.

Moreover, even if the rectangular frame 30 can be shifted in the vertical direction with respect to the load sensors 21, the coil springs 44 are interposed between the nuts 46 and the webs 31a, and accordingly, the load sensors 21 can be fixed to the rectangular frame 30 more stably and appropriately. Therefore, it becomes easier to assemble the passenger's weight measurement device 1.

Moreover, the load is stably applied from each of the coil springs 44 to each of the nuts 46 owing to elastic deformation of the coil spring 44, which is caused by tightening the nut 46.

Moreover, the submarine pipe 10 is located behind the front beam 32, and accordingly, when forward inertial force is applied to the passenger owing to a frontal collision or the like of the vehicle, buttocks of the passenger seated on the vehicle seat are restrained by the submarine pipe 10. Therefore, a so-called submarine phenomenon in which the passenger moves under a waist belt can be prevented.

Note that the present invention is not limited to the above-described embodiment, and various improvements and design changes can be made within the scope without departing from the gist of the present invention.

INDUSTRIAL APPLICABILITY

As described above, the present invention can be widely used, for example, for seats of an automobile, an electric train and other vehicles.

The invention claimed is:

1. A seat, comprising:
   right and left fixed rail members that are fixable to a vehicle floor;
   right and left movable frame members, each of the right and left movable frame members comprising a movable rail member that is disposed to be movable on a said fixed rail member and a side frame member extending in a front-and-rear direction above the movable rail member;
   a load sensor comprising a rod portion projecting from a main body of the load sensor and that is attached to at least one of the right and left movable frame members;
   a load sensor attachment portion is provided on at least a part of at least one of the right and left movable frame members;
   an elastic member that is penetrated by the rod portion;
   a first support surface portion for supporting one side of the elastic member and a second support surface portion for supporting the other side of the elastic member; and
   a space enlarging projecting portion that enlarges a space between the first support surface portion and the second support surface portion provided on at least one of the first support surface portion and the second support surface portion,
   wherein at least a part of the elastic member is in contact with a surface of the space enlarging projecting portion, and
   the space enlarging projecting portion is formed from a portion of one of the first support surface portion and the second support surface portion that bends away from the other of the first support surface portion and the second support surface portion.

2. The seat as claimed in claim 1, wherein the portion that bends away is formed on at least the first support surface portion, and the first support surface portion supports a side of the elastic member that is distal to the main body of the load sensor.

3. The seat as claimed in claim 1, wherein the portion that bends away comprises a first position regulating portion that regulates a radial position of the elastic member.

4. The seat as claimed in claim 1, wherein the load sensor attachment portion comprises a bracket member,
   at least one extending wall extending along a shaft line direction of the rod portion is formed on the bracket member, and
   the space enlarging projecting portion and the extending wall are arranged on a same plane that is perpendicular to the shaft line direction of the rod portion.

5. The seat as claimed in claim 2, wherein the second support surface portion supports a side of the elastic member that is proximate to the main body of the load sensor and comprises a second position regulating portion that regulates a radial position of the elastic member.

6. The seat as claimed in claim 1, wherein the load sensor attachment portion comprises a bracket member,
a first extending wall and a second extending wall that extend along a shaft line direction of the rod portion are formed on the bracket member at different positions, respectively,
the elastic member is arranged between the first extending wall and the second extending wall, and
the elastic member, the first extending wall, and the second extending wall are arranged on a same plane that is perpendicular to the shaft line direction of the rod portion.

7. A seat, comprising:
right and left fixed rail members that are fixable to a vehicle floor;
right and left movable frame members, each of the right and left movable frame members comprising a movable rail member that is disposed to be movable on a said fixed rail member and a side frame member extending in a front-and-rear direction above the movable rail member;
a load sensor comprising a rod portion projecting from a main body of the load sensor and that is attached to at least one of the movable frame members;
a load sensor attachment portion comprising a through-hole that accepts the rod portion provided on at least a part of at least one of the movable frame members,
an elastic member that is penetrated by the rod portion;
a first support surface portion and a second support surface portion that support the elastic member are provided on a line parallel to a shaft line direction of the rod portion; and
a space enlarging portion that enlarges a space between the first support surface portion and the second support surface portion along the shaft line direction of the rod portion, at least a part of the elastic member being provided in the space enlarged by the space enlarging portion, wherein
the space enlarging portion and a main body of the load sensor are arranged in a same line that is parallel to the shaft line direction of the rod portion, and
the space enlarging portion is formed from a portion of one of the first support surface portion and the second support surface portion that bends away from the other of the first support surface portion and the second support surface portion.

8. The seat as claimed in claim 7, wherein the portion that bends away is formed on at least the first support surface portion, and the first support surface portion supports a side of the elastic member that is distal to the main body of the load sensor.

9. The seat as claimed in claim 7, wherein the portion that bends away comprises a first position regulating portion that regulates a radial position of the elastic member.

10. The seat as claimed in claim 7, wherein the load sensor attachment portion comprises a bracket member,
at least one extending wall extending in the shaft line direction of the rod portion is formed on the bracket member, and
the space enlarging portion and the extending wall are arranged on a same plane that is perpendicular to the shaft line direction of the rod portion.

11. The seat as claimed in claim 8, wherein the second support surface portion supports a side of the elastic member that is proximate to the main body of the load sensor and comprises a second position regulating portion that regulates a radial position of the elastic member.

12. The seat as claimed in claim 7, wherein the load sensor attachment portion comprises a bracket member,
a first extending wall and a second extending wall that extend in the shaft line direction of the rod portion are formed on the bracket member at different positions, respectively,
the elastic member is arranged between the first extending wall and the second extending wall, and
the elastic member, the first extending wall, and the second extending wall are arranged on a same plane that is perpendicular to the shaft line direction of the rod portion.

13. The seat as claimed in claim 4, wherein the extending wall extends in a direction away from the main body of the load sensor, and the space enlarging projecting portion projects in the direction away from the main body of the load sensor, and
an end of the space enlarging projecting portion that is distal to the main body of the load sensor is arranged to be closer to the main body of the load sensor than an end of the extending wall that is distal to the main body of the load sensor.

14. The seat as claimed in claim 6, wherein the first extending wall and the second extending wall extend in a direction away from the main body of the load sensor, and the space enlarging projecting portion projects in the direction away from the main body of the load sensor, and
an end of the space enlarging projecting portion that is distal to the main body of the load sensor is arranged to be closer to the main body of the load sensor than an end that is distal to the main body of the load sensor of one extending wall of the first extending wall and the second extending wall, the one extending wall having a larger extending amount than the other extending wall.

15. The seat as claimed in claim 10, wherein the extending wall extends in a direction away from the main body of the load sensor, and the space enlarging projecting portion projects in the direction away from the main body of the load sensor, and
an end of the space enlarging projecting portion that is distal to the main body of the load sensor is arranged to be closer to the main body of the load sensor than an end of the extending wall that is distal to the main body of the load sensor.

16. The seat as claimed in claim 12, wherein the first extending wall and the second extending wall extend in a direction away from the main body of the load sensor and the space enlarging projecting portion extends in the direction away from the main body of the load sensor, and
an end of the space enlarging projecting portion that is distal to the main body of the load sensor is arranged to be closer to the main body of the load sensor than an end that is distal to the main body of the load sensor of one extending wall of the first extending wall and the second extending wall, the one extending wall having a larger extending amount than the other extending wall.

17. A seat, comprising:
right and left fixed rail members that are fixable to a vehicle floor;
right and left movable frame members, each of the right and left movable frame members comprising a movable rail member that is disposed to be movable on a said fixed rail member, a side frame member extending in a front-and-rear direction above the movable rail member, and a bracket member;

a load sensor comprising a rod portion projecting from a main body of the load sensor and that is attached to at least one of the movable frame members by the bracket member;

an elastic member;

a load sensor attachment portion comprising a through-hole that accepts the rod portion provided on the bracket member;

a screw portion provided on the rod portion;

a first support surface portion that supports the elastic member is provided on one side of the elastic member and a second support surface portion that supports the elastic member is provided on an other side of the elastic member in a shaft line direction of the rod portion;

the first support surface portion is provided on the bracket member;

the second support surface portion is provided on a holder member for supporting the elastic member; and a space enlarging portion for enlarging a space between the first support surface portion and the second support surface portion along the shaft line direction of the rod portion, the elastic member being provided in the space enlarged by the space enlarging portion so as to contact at least a part of the elastic member with the space enlarging portion, wherein the load sensor is attached to the load sensor attachment portion via the elastic member and by screwing a nut member into the screw portion;

the space enlarging portion and a main body of the load sensor are arranged in a same line that is parallel to the shaft line of the rod portion, at least one extending wall extending in the shaft line direction of the rod portion is formed on the bracket member, the space enlarging portion and the extending wall are arranged on a same plane that is perpendicular to the shaft line direction of the rod portion, and the space enlarging portion is formed from a portion of the first support surface portion and the second support surface portion that bends away from the other of the first support surface portion and the second support surface portion.

18. The seat as claimed in claim 17, wherein the portion that bends away is formed on at least the first support surface portion, and the first support surface portion supports a side of the elastic member that is distal to the main body of the load sensor.

19. The seat as claimed in claim 17, wherein the portion that bends away comprises a first position regulating portion that regulates a radial position of the elastic member.

20. The seat as claimed in claim 17, wherein the at least one extending wall and the nut member are arranged on a same plane that is perpendicular to the shaft line direction of the rod portion.

21. The seat as claimed in claim 18, wherein the second support surface portion supports a side of the elastic member that is proximate to the main body of the load sensor and comprises a second position regulating portion that regulates a radial position of the elastic member.

22. The seat as claimed in claim 17, wherein the load sensor attachment portion comprises the bracket member, the at least one extending wall and a second extending wall extend in the shaft line direction of the rod portion and are formed on the bracket member at different positions, respectively, the elastic member is arranged between the at least one extending wall and the second extending wall, and the elastic member, the at least one extending wall, and the second extending wall are arranged on a same plane that is perpendicular to the shaft line direction of the rod portion.

23. The seat as claimed in claim 20, wherein the at least one extending wall extends in a direction away from the main body of the load sensor, and the space enlarging portion projects in the direction away from the main body of the load sensor, and an end of the space enlarging portion that is distal to the main body of the load sensor is arranged to be closer to the main body of the load sensor than an end of the extending wall that is distal to the main body of the load sensor.

24. The seat as claimed in claim 22, wherein the at least one extending wall and the second extending wall extend in a direction away from the main body of the load sensor, and the space enlarging portion projects in the direction away from the main body of the load sensor, and an end of the space enlarging portion that is distal to the main body of the load sensor is arranged to be closer to the main body of the load sensor than an end that is distal to the main body of the load sensor of one extending wall of the at least one extending wall and the second extending wall, the one of the extending walls having a larger extending amount than the other extending wall.

25. The seat as claimed in claim 17, wherein a collar member into which the rod portion is inserted is provided between the nut member and the main body of the load sensor, the nut member comprises a cylinder portion, the collar member comprises a cylinder portion, and the cylinder portion of the nut member and the cylinder portion of the collar member are arranged in a same line that is parallel to the shaft line direction of the rod portion, the elastic member is disposed outside the cylinder portion of the collar member, and the at least one extending wall and the cylinder portion of the collar member are arranged on a same plane that is perpendicular to the shaft line direction of the rod portion.

26. The seat as claimed in claim 25, wherein the collar member is provided inside of the holder member.

27. The seat as claimed in claim 26, wherein the holder member and the collar member are different members from each other.

28. The seat as claimed in claim 7, wherein the space enlarging portion is disposed more closely to a shaft line of the rod portion than to an outer surface of the main body of the load sensor.

29. The seat as claimed in claim 17, wherein the space enlarging portion is disposed more closely to a shaft line of the rod portion than to an outer surface of the main body of the load sensor.

30. The seat as claimed in claim 7, wherein a connector is provided on an outer surface of the main body of the load sensor, and an end of the connector is disposed further from a shaft line of the rod portion than from the space enlarging portion.

31. The seat as claimed in claim 17, wherein a connector is provided on an outer surface of the main body of the load sensor, and an end of the connector is disposed further from a shaft line of the rod portion than from the space enlarging portion.

32. The seat as claimed in claim 17, wherein a side of the main body of the load sensor that is opposite to the rod portion is attached to the at least one movable rail member, a movable rail member side extending wall extending in the shaft line direction of the rod portion is formed on the load sensor attachment portion of the movable rail members, and the movable rail member side extending wall is provided further from a shaft line of the rod portion than from the space enlarging portion.

33. The seat as claimed in claim 1, wherein the portion that bends away is formed on at least the first support surface portion, and the first support surface portion supports a side of the elastic member that is distal to the main body of the load sensor, and the portion that bends away comprises a first position regulating portion that regulates a radial position of the elastic member.

34. The seat as claimed in claim 17, wherein the portion that bends away comprises a first position regulating portion that regulates radial position of the elastic member, the at least one extending wall and the nut member are arranged on a same plane that is perpendicular to the shaft line direction of the rod portion, the load sensor attachment portion comprises the bracket member, a at least one extending wall and a second extending wall extend the shaft line direction of the rod portion and are formed on the bracket member at different positions, respectively, the elastic member is arranged between the at least one extending wall and the second extending wall, and the elastic member, the at least one extending wall, and the second extending wall are arranged on a same plane that is perpendicular to the shaft line direction of the rod portion.

35. The seat as claimed in claim 17, wherein the portion that bends away portion comprises a first position regulating portion that regulates a radial position of the elastic member, the at least one extending wall and the nut member are arranged on a same plane that is perpendicular to the shaft line direction of the rod portion, the load sensor attachment portion comprises the bracket member, at least one extending wall and a second extending wall extend in the shaft line direction of the rod portion and are formed on the bracket member at different positions, respectively, the elastic member is arranged between the at least one extending wall and the second extending wall, the elastic member, the at least one extending wall, and the second extending wall are arranged on a same plane that is perpendicular to the shaft line direction of the rod portion, the at least one extending wall and the second extending wall extend in a direction away from the main body of the load sensor, and the space enlarging portion projects in the direction away from the main body of the load sensor, and an end of the space enlarging portion that is distal to the main body of the load sensor is arranged to be closer to the main body of the load sensor than an end that is distal to the main body of the load sensor of one extending wall of the at least one extending wall and the second extending wall, the one of the extending walls having a larger extending amount than the other extending wall, a connector is provided on an outer surface of the main body of the load sensor, and an end of the connector is disposed further from the shaft line of the rod portion than from the space enlarging portion.

36. A seat, comprising:

right and left fixed rail members that are fixable to a vehicle floor;

right and left movable frame members, each of the right and left movable frame members comprising a movable rail member that is disposed to be movable on a said fixed rail member and a side frame member extending in a front-and-rear direction above the movable rail member;

a load sensor comprising a rod portion projecting from a main body of the load sensor and that is attached to at least one of the right and left movable frame members;

a load sensor attachment portion provided on at least a part of at least one of the right and left movable frame members;

an elastic member that is penetrated by the rod portion; and a first support member having a first support surface portion for supporting one side of the elastic member and a second support member having a second support surface portion for supporting the other side of the elastic member, wherein at least one of the first support member and the second support member includes a bent portion forming an enlarged space between the first support surface portion and the second support surface portion; and at least a portion of the elastic member is located in the enlarged space.

37. A seat, comprising:

right and left fixed rail members that are fixable to a vehicle floor;

right and left movable frame members, each of the right and left movable frame members comprising a movable rail member that is disposed to be movable on a said fixed rail member and a side frame member extending in a front-and-rear direction above the movable rail member;

a load sensor comprising a rod portion projecting from a main body of the load sensor and that is attached to at least one of the right and left movable frame members;

a load sensor attachment portion provided on at least a part of at least one of the right and left movable frame members;

an elastic member that is penetrated by the rod portion; and a first support member for supporting one side of the elastic member and a second support member for supporting the other side of the elastic member, wherein one of the first and second support members has two planes that form a step, and one of the two planes that is located farther from the other of the first and second support members than the other of the two planes supports the elastic member.

38. A seat comprising:

right and left fixed rail members that are fixable to a vehicle floor;

right and left movable frame members, each of the right and left movable frame members comprising a movable rail member that is disposed to be movable on a said fixed rail member and a side frame member extending in a front-and-rear direction above the movable rail member;

a load sensor comprising a rod portion projecting from a main body of the load sensor and that is attached to at least one of the right and left movable frame members;

a load sensor attachment portion provided on at least a part of at least one of the right and left movable frame members;

an elastic member that is penetrated by the rod portion; and a first support member and a second support member for supporting the elastic member, said first support member comprising a first planar surface and a second planar surface, wherein said first planar surface and said second planar surface face a plane that is coplanar with a surface of the second support member, and said second planar surface contacts the elastic member and is farther from the plane than the first planar surface.

39. The seat according to claim 36, wherein the space enlarged by the bent portion is a distance, on a line parallel to a shaft line direction of the rod portion, between the portion of the first support surface portion that contacts the elastic member and the portion of the second support surface portion that contacts the elastic member.

40. A method of assembling a seat comprising right and left fixed rail members that are fixable to a vehicle floor and right and left movable frame members, each of the right and left movable frame members comprising a movable rail member that is disposed to be movable on a said fixed rail member and a side frame member extending in a front-and-rear direction above the movable rail member, the method comprising:

attaching a load sensor comprising a rod portion projecting from a main body of the load sensor to a load sensor attachment portion located on at least a part of at least one of the right and left movable frame members; and attaching an elastic member (a) so that the elastic member is penetrated by the rod portion, (b) so that one side of the elastic member is supported by a first support surface portion and the other side of the elastic member is supported by a second support surface portion, and (c) so that the elastic member is in contact with a surface of a space enlarging projecting portion (1) that enlarges a space between the first support surface portion and the second support surface portion and (2) that is constituted by a portion of one of the first support surface portion and the second support surface portion that bends away from the other of the first support surface portion and the second support surface portion.

41. A method of assembling a seat comprising right and left fixed rail members that are fixable to a vehicle floor and right and left movable frame members, each of the right and left movable frame members comprising a movable rail member that is disposed to be movable on a said fixed rail member and a side frame member extending in a front-and-rear direction above the movable rail member, the method comprising:

attaching a load sensor comprising a rod portion projecting from a main body of the load sensor to at least one of the right and left movable frame members so that the rod portion is accepted by a through-hole of a load sensor attachment portion located on at least a part of the at least one movable frame member; and attaching an elastic member (a) so that the elastic member is penetrated by the rod portion, (b) so that the elastic member is supported by a first support surface portion and a second support surface portion that are provided on a line parallel to a shaft line direction of the rod portion, and (c) so that at least a part of the elastic member is located in a space between the first support surface portion and the second support surface portion that is enlarged along the shaft line direction of the rod portion by a space enlarging portion, the space enlarging portion being constituted by a portion of one of the first support surface portion and the second support surface portion that bends away from the other of the first support surface portion and the second support surface portion, and the space enlarging portion and the main body of the load sensor being arranged along a same line that is parallel to the shaft line direction of the rod portion.

42. A method of assembling a seat comprising right and left fixed rail members that are fixable to a vehicle floor and right and left movable frame members, each of the right and left movable frame members comprising: (1) a movable rail member that is disposed to be movable on a said fixed rail member, (2) a side frame member extending in a front-and-rear direction above the movable rail member, and (3) a bracket member, the method comprising:

attaching a load sensor comprising a rod portion projecting from a main body of the load sensor to a load sensor attachment portion located on the bracket member of at least one of the right and left movable frame members so that the rod portion is accepted by a through-hole of the load sensor attachment portion;

attaching an elastic member (a) so that one side of the elastic member is supported by a first support surface portion on the bracket member and an other side of the elastic member is supported by a second support surface portion located on a holder member of the elastic member in a shaft line direction of the rod portion, (b) so that the elastic member is located in a space between the first support surface portion and the second support surface portion enlarged along the shaft line direction of the rod portion by a space enlarging portion (1) that is in contact with at least a part of the elastic member and that constitutes a portion of one of the first support surface portion and the second support surface portion that bends away from the other of the first support surface portion and the second support surface portion; and screwing a nut member into a screw portion located on the rod portion so that the load sensor is attached to the load sensor attachment portion via the elastic member, wherein the space enlarging portion and the main body of the load sensor are arranged on a same line that is parallel to the shaft line of the rod portion, and wherein the space enlarging portion and at least one extending wall located on the bracket member and extending in the shaft line direction of the rod portion are arranged on a same plane that is perpendicular to the shaft line direction of the rod portion.

43. A method of assembling a seat comprising right and left fixed rail members that are fixable to a vehicle floor and right and left movable frame members, each of the right and left movable frame members comprising a movable rail member that is disposed to be movable on a said fixed rail member and a side frame member extending in a front-and-rear direction above the movable rail member, the method comprising:

attaching a load sensor comprising a rod portion projecting from a main body of the load sensor to a load sensor attachment portion located on at least a part of at least one of the right and left movable frame members; and attaching an elastic member (a) so that the elastic member is penetrated by the rod portion, (b) so that one side of the elastic member is supported by a first support surface portion of a first support member and the other side of the elastic member is supported by a second support surface portion of a second support member, and (c) so that at least a portion of the elastic member is located in an enlarged space (1) that is between the first support surface portion and the second support surface portion and (2) that is constituted by a bent portion of at least one of the first support member and the second support member.

44. A method of assembling a seat comprising right and left fixed rail members that are fixable to a vehicle floor and right and left movable frame members, each of the right and left movable frame members comprising a movable rail member that is disposed to be movable on a said fixed rail member and a side frame member extending in a front-and-rear direction above the movable rail member, the method comprising:
   attaching a load sensor comprising a rod portion projecting from a main body of the load sensor to a load sensor attachment portion located on at least a part of at least one of the right and left movable frame members; and
   attaching an elastic member (a) so that the elastic member is penetrated by the rod portion, (b) so that one side of the elastic member is supported by a first support member and the other side of the elastic member is supported by a second support member, and (c) so that the elastic member is supported by one of two planes constituting a step of one of the first and second support members that is located farther from the other of the first and second support members than the other of the two planes.

45. A method of assembling a seat comprising right and left fixed rail members that are fixable to a vehicle floor and right and left movable frame members, each of the right and left movable frame members comprising a movable rail member that is disposed to be movable on a said fixed rail member and a side frame member extending in a front-and-rear direction above the movable rail member, the method comprising:
   attaching a load sensor comprising a rod portion projecting from a main body of the load sensor to a load sensor attachment portion located on at least a part of at least one of the right and left movable frame members; and
   attaching an elastic member (a) so that the elastic member is penetrated by the rod portion, (b) so that the elastic member is supported by a second support member and a first support member that comprises a first planar surface and a second planar surface that face a plane coplanar with a surface of the second support member, and (c) so that the elastic member contacts the second planer surface that is farther from the plane than the first planar surface.

* * * * *